United States Patent [19]

Tsukatani et al.

[11] Patent Number: 5,778,257

[45] Date of Patent: Jul. 7, 1998

[54] MULTI-SESSION DISC-SHAPED FOR RECORDING AUDIO AND COMPUTER DATA HAVING DISC TYPE CODE AREA LOCATED IN EACH SESSION FOR RECORDING COMMON AND PARTICULAR DISC TYPE CODE

[75] Inventors: Shigeki Tsukatani; Tatsuya Inokuchi, both of Kanagawa; Hiroyuki Ito, Tokyo, all of Japan

[73] Assignee: Sony Corporation, Tokyo, Japan

[21] Appl. No.: 592,962

[22] Filed: Jan. 29, 1996

[30] Foreign Application Priority Data

Jan. 30, 1995 [JP] Japan .................... 7-013211

[51] Int. Cl.[6] .................................................. G11B 7/24
[52] U.S. Cl. ........................... 395/894; 369/275.3
[58] Field of Search ...................... 369/48, 1, 58, 369/32, 275.2, 275.3; 358/342; 395/894

[56] References Cited

U.S. PATENT DOCUMENTS

| | | | |
|---|---|---|---|
| 5,200,943 | 4/1993 | Sano et al. ........................... | 369/48 |
| 5,430,553 | 7/1995 | Misono et al. ...................... | 358/342 |
| 5,465,240 | 11/1995 | Mankovitz ......................... | 369/1 |
| 5,506,823 | 4/1996 | Sanada ............................... | 369/48 |
| 5,559,778 | 9/1996 | Inokuchi et al. ................... | 369/58 |
| 5,561,644 | 10/1996 | Kondo ............................... | 369/32 |
| 5,592,463 | 1/1997 | Muramatsu et al. ............... | 369/275.2 |

FOREIGN PATENT DOCUMENTS

| | | | |
|---|---|---|---|
| 0165320 A1 | 12/1985 | European Pat. Off. ........ | G11B 7/00 |
| 0507397 A2 | 10/1992 | European Pat. Off. ........ | G11B 27/10 |
| 0613136 A2 | 8/1994 | European Pat. Off. ........ | G11B 20/12 |
| 0627739 A2 | 12/1994 | European Pat. Off. ........ | G11B 27/00 |
| 0706185 A1 | 4/1996 | European Pat. Off. ........ | G11B 23/00 |
| 94/29867 | 12/1994 | WIPO .......................... | G11B 27/00 |

*Primary Examiner*—Thomas C. Lee
*Assistant Examiner*—David Ton
*Attorney, Agent, or Firm*—Limbach & Limbach LLP; Seong-Kuh Oh

[57] ABSTRACT

A recording apparatus, a reproducing apparatus and a multi-session disc-shaped recording medium (CD-R disc) having a first session comprised only of audio tracks, a first disc code specifying the audio session and which is recorded in the lead-in area of the first session, and a second disc code which is recorded in the remaining sessions on the CD-R disc.

29 Claims, 7 Drawing Sheets

| S0,S1 | CONTROL | ADR | TNO | POINT | MIN | SEC | FRAME | ZERO | PMIN | PSEC | PFRAME | CRC |

# MULTI-SESSION DISC-SHAPED FOR RECORDING AUDIO AND COMPUTER DATA HAVING DISC TYPE CODE AREA LOCATED IN EACH SESSION FOR RECORDING COMMON AND PARTICULAR DISC TYPE CODE

BACKGROUND OF THE INVENTION

1. Field of the Invention

This invention relates to a multi-session disc-shaped recording medium, such as a compact disc having both audio data and computer data recorded thereon and a recording apparatus and a reproducing apparatus for the recording medium.

2. Description of the Related Art

The first commercialized compact discs have been music CDs (CD-DA: compact disc-digital audio) and the standard therefor has recently been expanded for multi-media. Typical of the standards for CD are:

CD-DA (compact disc-digital audio) format;

CD-ROM (compact disc-read only memory) format;

CD-I (compact disc-interactive) format; and

CD-ROM/XA (CD-ROM extended architecture) format.

The CD-DA format is a format for audio, forms the basis for other CD formats, and prescribes the signal processing system and the physical structure of the disc. The CD-ROM format is a format extended for computer data and prescribes, as a physical block structure, a mode 1 having an error detection code (EDC) and an error correction code (ECC) as extended portions, and a mode 2 not having EDC/ECC as the extended portions. The CD-I format is a format which has picture data and character data as extended portions to audio data, and has a; block structure comprised of the block structure of the CD-ROM mode 2. The CD-I format prescribes, as a physical block structure, a form 1 having the EDC/ECC as extended portions and a form 2 not having the EDC/ECC as extended portions. The CD-ROM/XA format prescribes interleaving computer data and audio data for synchronizing the computer data and the audio data. The block construction in the CD-ROM/XA format is comprised of the block construction of the CD-ROM mode 2. The CD-ROM/XA format prescribes, as a physical block structure, a form 1 having the EDC/ECC as extended portions and a form 2 not having the EDC/ECC as extended portions.

Recently, a CD-R (compact disc-recordable) disc having a recording surface coated with an organic recording material on one major surface of a disc of the same size as the compact disc (CD), and on which desired data can be written by a light beam, has been proposed, while a CD-MO (compact disc-magneto optical) for rewritable CD and a CD-WO (compact disc- write once) for a write-once optical disc have been prescribed. The compact discs of the above-mentioned various formats are currently fabricated using the CD-R disc.

With the CD format, each track has a unitary file structure written once and for all, or is an audio segment. Initially, the CD-DA disc or the CD-ROM disc is a replay- only disc, and is a single-session disc having only one session constituted by one or more tracks comprised of an audio track carrying audio data and/or a data track carrying computer data.

However, since plural sessions may be recorded on the write-once disc CD-R disc, a multi-session disc has also be commercialized using the CD-R disc.

However, old generation recorders or players do not support multi-session discs. On the other hand, a format constraint is imposed on the conventional CD-R disc, such that, if an area termed data session accessible by the CD-ROM device is allowed to co-exist with the audio session in the same disc by a multi-session format, there is a risk that an audio track cannot be reproduced as audio data or data in the data track is erroneously reproduced as audio data due to the existence of the code that can not possibly be recognized with such an old generation CD player.

In view of the above-described status of the related art, it is an object of the present invention to provide a multi-session disc-shaped recording medium having an audio session which can be reliably audio-reproduced with an old generation CD player, a recording apparatus and a reproducing apparatus for such multi-session disc-shaped recording medium.

SUMMARY OF THE INVENTION

The present invention provides a disc-shaped recording medium having plural sessions each made up of one or more tracks, that is audio tracks having audio data recorded thereon and/or data tracks having computer data recorded thereon. A disc type code area in which a common disc type code is recorded in other than a particular session among the plural sessions is provided on the recording medium. The particular session is an audio session comprised only of audio tracks and having recorded therein a disc type code specifying that the particular session is comprised only of audio tracks.

With the disc-shaped recording medium of the present invention, plural sessions are each comprised of a lead-in area specifying the beginning of a session, a program session comprised of audio tracks and/or data tracks, and a lead-out area specifying the end of the session. The lead-in area has the disc type code area having the disc type code recorded therein. With the disc-shaped recording medium of the present invention, the first session among the plural sessions is the particular session. The audio track is provided at the end of the data track in a session comprised of both the audio tracks and the data tracks.

In another aspect, the present invention also provides a recording apparatus for a disc-shaped recording medium having plural sessions each made up of one or more tracks, that is audio tracks having audio data recorded thereon, data tracks having computer data recorded thereon, or both audio tracks and data tracks. The recording apparatus includes recording control means for causing only audio data to be recorded in the particular session and for causing audio data or computer data to be recorded in other sessions. The particular session is an audio session comprised only of audio tracks. The recording apparatus also includes disc type code recording control means for causing a common disc type code to be recorded in a disc type code area of each of the sessions other than the particular session, and for causing a disc type code indicating that the session is comprised only of the audio tracks to be recorded in the disc type code area in the particular session.

With the recording apparatus for a disc-shaped recording medium according to the present invention, plural sessions are each comprised of a lead-in area specifying the beginning of a session, a program area comprised of audio tracks or data tracks and a lead-out area specifying the end of the session. The disc type code recording control means causes a disc type code to be recorded in a disc type code area of the lead-in area. The recording control means sets the first session of the plural sessions as the particular session and only audio data is recorded in the first session. Where audio data and computer data are recorded in the same session, the recording control means also causes the audio tracks to be recorded subsequently to the data tracks.

The present invention also provides a reproducing apparatus for reproducing a disc-shaped recording medium having plural sessions each made up of one or more tracks, that is audio tracks having audio data recorded thereon or data tracks having computer data recorded thereon, and which includes a disc type code area in which a common disc type code is recorded in other than a particular session among the plural sessions. The particular session is an audio session comprised only of audio tracks and having recorded therein a disc type code specifying that the particular session is comprised only of audio tracks. The reproducing apparatus includes decoding means for decoding playback data from the disc-shaped recording medium, and disc type code discriminating means for discriminating the common disc type code recorded in the disc type code area of the plural sessions other than the particular session based upon playback data from the disc-shaped recording medium. The recording apparatus also includes control means for switching the decoding operation by the encoding means responsive to the disc type code discriminated by the disc type code discriminating means.

As mentioned above, the disc-shaped recording medium has the audio tracks recorded subsequent to the data tracks in a session comprised of audio tracks and data tracks. The disc type code discriminating means detects a session having a data track at a leading end thereof, based upon playback data from the disc-shaped recording medium, and discriminates the disc type code recorded in the disc type code area of the session as being a common disc type code.

With the recording apparatus for the disc-shaped recording medium according to the present invention, control is executed by the recording control means so that only audio data is recorded in the particular session as an audio session comprised only of audio tracks, while control is executed by the disc type code recording control means so that the common disc type code is recorded in the disc type code recording area of the sessions other than the particular session and so that a disc type code indicating that the session is comprised only of the audio tracks is recorded in the disc type code area of the particular session.

Furthermore, with the reproducing apparatus for the disc-shaped recording medium according to the present invention, the common disc type code recorded in the disc type code area of the sessions other than the particular session comprised only of the audio tracks is discriminated by the disc type code discriminating means, and decoding by the decoding means is switched by control means depending upon the disc type code for decoding the playback data from the disc-shaped recording medium by the decoding means depending upon the disc type code.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENTS

Referring to the drawings, a disc-shaped recording medium, a recording apparatus and a reproducing apparatus for the recording medium will be explained in detail. With the embodiment, now to be described, the present invention is applied to an optical disc recording/reproducing system employing a CD-R disc as a medium.

Figure 1:
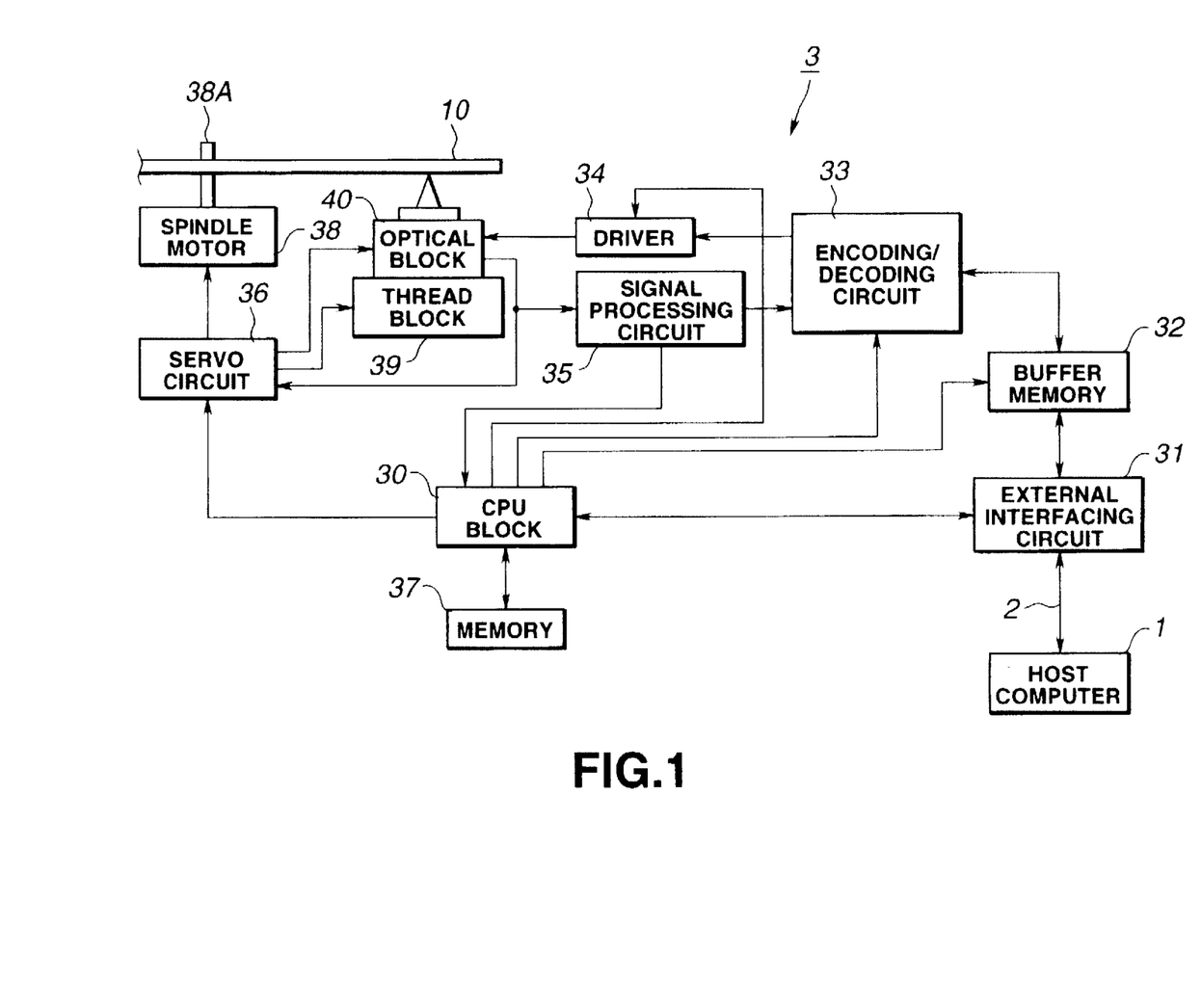
FIG. 1 is a block diagram showing an arrangement of an optical disc recording/reproducing apparatus according to the present invention.

The optical disc recording/reproducing system includes a host computer 1, and a CD-R drive 3 connected to the host computer 1 via a SCSI (small computer system interface) bus 2, as shown in FIG. 1. A write-once type CD-R disc 10 is detachably loaded on the CD-R drive 3. Plural disc drives may be connected via a daisy chain construction to the SCSI bus 2.

The CD-R drive 3 includes an external interfacing circuit 31 connected to the SCSI bus 2, a central processing unit (CPU) 30, and a buffer memory 32. The buffer memory 32 is connected to an encoder/decoder circuit 33 which, in turn, is connected to a driver 34, a signal processing circuit 35, and the CPU block 30. The CPU block 30 is also connected to a servo circuit 36 and a memory 37. In addition, the CD-R drive includes a spindle motor 38, a thread block 39 and an optical block 40 connected to the servo circuit 36. The CD-R disc 10 may be detachably loaded on a spindle shaft 38A of the spindle motor 38.

The CPU block 30, functioning as control means for the CD-R drive 3, includes a CPU, a ROM, a working RAM, a register and an input/output interface (all not shown). In the ROM are pre-recorded program data for deciphering commands for the SCSI interface and program data for performing a processing based upon SCSI interfacing. The buffer memory 32 temporarily stores data recorded on the CD-R disc 10 or data read out from the CD-R disc 10, under control by the CPU block 30. In the memory 37 is transiently stored the TOC information specifying the recording contents of the CD-R disc 10. Data write/readout in or from the memory is executed by the CPU block 30. The encoder/decoder circuit 33 encodes the recording data and decodes the playback data, under control of the CPU block 30.

The driver 34 drives a laser light source (not shown) of the optical block 40 optically scanning the CD-R disc 10 under control of the CPU block 30, and is connected to both the encoder/decoder circuit 33 and to the optical block 40. The driver 34 is responsive to recording data sent from the encoder/decoder circuit 33 in order to drive the laser light source intermittently for generating the intensity of the laser light required for recording during the recording mode, and for generating the (lower) intensity of the laser light required for reproduction during the playback mode.

The signal processing circuit 35 processes playback RF signals produced on optically scanning the CD-R disc 10 by the optical block 40 and sends the results of processing to the CPU block 30 and to the encoder/decoder circuit 33. The servo circuit 36 controls the operation of the spindle motor 38, thread block 39 and the optical block 40, under control by the CPU block 30. The servo circuit 36 controls the speed of rotation of the spindle motor 38, the feed of the optical block 39 by the thread block 40 and the focusing and the tracking of the optical block 40 designed for optically scanning the CD-R disc 10, based upon speed reference data, recording position/playback position specifying data or playback RF signals supplied from the optical block 40.

Figure 2:
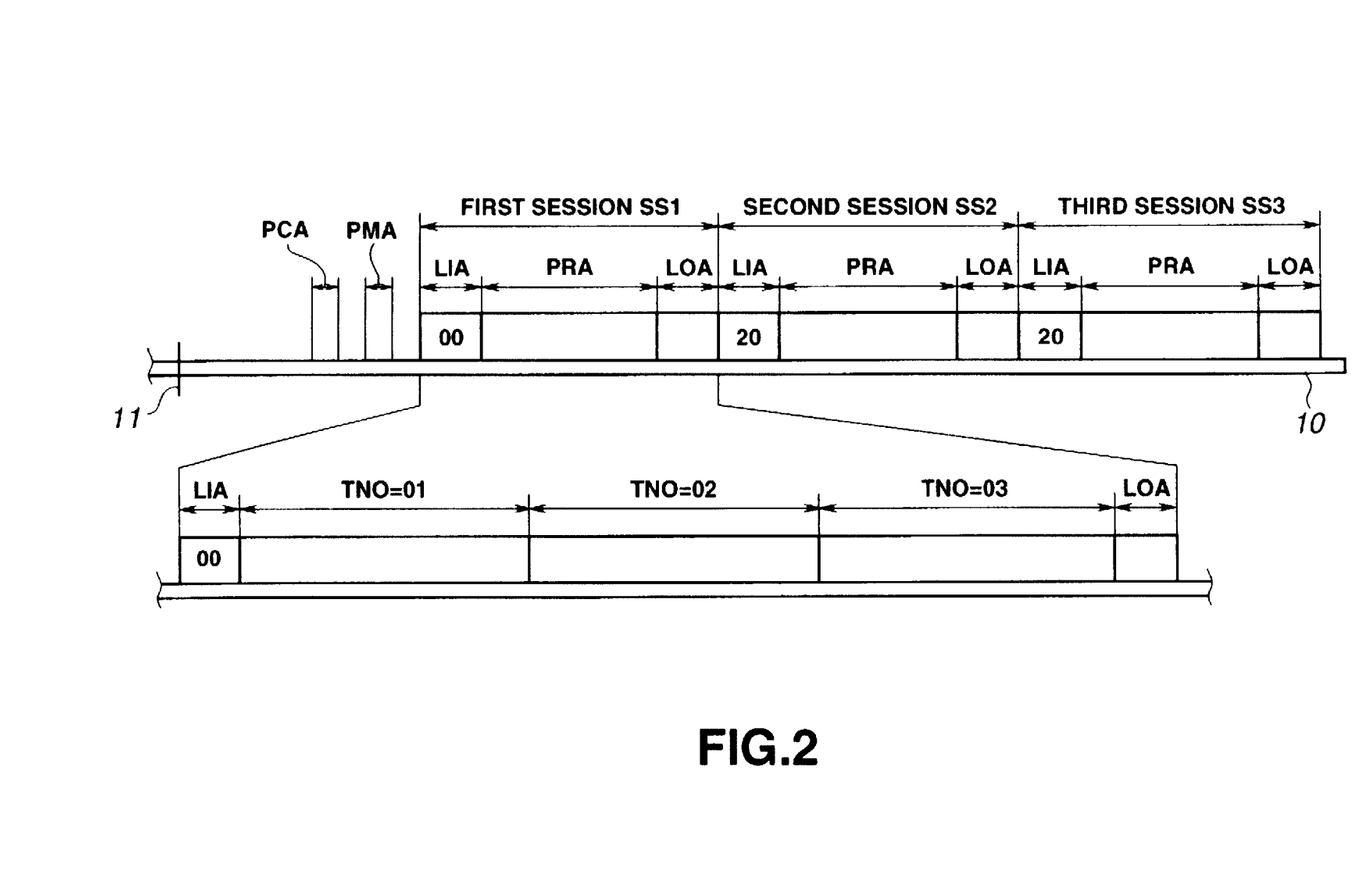
FIG. 2 illustrates the logical structure of a CD-R disc employed in the recording/reproducing apparatus.

The CD-R disc 10 has a logical structure as shown in FIG. 2. That is, the CD-R disc 10 is a multi-session disc having a light intensity calibration area PCA, a program memory area PMA, a first session SS1, a second session SS2 and a third session SS3, arranged sequentially in a direction radially outwardly from the disc center 11. The light intensity calibration area PCA is a test write area for deciding the laser power of the laser light for data write/readout in the CD-R drive 3. The CD-R drive 3 controls tentative writing in the light intensity calibration area PCA of the CD-R disc 10 by the CPU block 30 in order to decide the laser power, that is, the light intensity, of the laser light for data write/readout for controlling the driver 34 for generating an optimum volume of the laser light from the laser light source of the optical block 4. The program memory area PMA is an area in which the information concerning the tracks of all sessions on the disc is updated and preserved.

The CD-R drive 3 reads out the information concerning the tracks of all sessions on the disc from the program memory area PMA of the CD-R disc 10 by the CPU block 30 and causes the read-out data to be stored in the memory 37. This information is referred to herein as the PMA information. The CD-R drive 3 updates the PMA information in the memory 37 each time the recording operation is executed. For example, at the end of the recording operation, the CD-R drive causes the latest PMA information to be read out from memory 37 and records the read-out information in the program memory area PMA.

Each of the sessions SS2 and SS3 is an area for recording audio data, computer data, or both kinds of data. As will be explained further herein, the session SS1 is made up only of audio tracks. Each of the sessions SS1–SS3 is comprised of a lead-in area LIA specifying the beginning of a session, a program area PRA made up of one or more tracks and a lead-out area LOA specifying the end of the session. In the present embodiment, the first session SS1 is defined as an audio session, and has its program area PRA constituted by three audio tracks, track numbers TNO=1 to 3, having audio data recorded therein.

Figure 3:
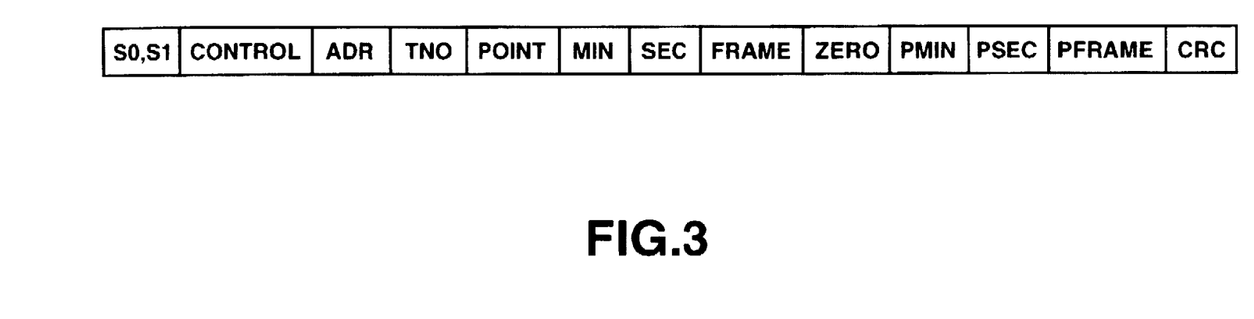
FIG. 3 illustrates a data structure of the TOC information recorded in the TOC area of the CD-R disc.

In the respective lead-in areas (LIA) of the sessions SS1, SS2 and SS3, the information concerning the recorded tracks and the information concerning the disc are encoded in the sub-code Q-channel as the table-of-contents (TOC) information and recorded in the respective TOC areas. The TOC information is a data structure prescribed by CD format standards and is composed of synchronizing bits S0, S1 used by a decoder to distinguish a control word in a block from audio information, CONTROL (an identification of the kind of information within a track), ADR (the value of which determines what kind of information is in the block, i.e., TOC items, a disc identification item, a skip track item, etc.), TNO (track number), POINT (index number within a track), MIN, SEC, FRAME (which together can specify the running time within a track), ZERO, the starting point of a track indicated by PMIN, PSEC, PFRAME and data relating to error correction CRC, as shown in FIG. 3. An explanation of the significance of each of these terms, as may be necessary, will be given further in this specification.

The CD-R drive 3 formulates the TOC information of respective sessions of the CD-R disc 10 by the CPU block 30 in the memory 37 in order to read out the TOC information of the respective sessions from the memory 37 on termination of the recording operation and in order to record the read-out TOC information in the respective TOC areas of the sessions.

PMIN at POINT=A0 in the TOC area is defined so as to give the value of the leading track number of the program area, while PSEC is defined so as to give the following disc type codes [00], [10], [20] which specify the disc format in hexadecimal numbers: i.e.

| PSEC = | Disc type = |
|--------|-------------|
| 00:    | CD-DA and CD-ROM; |
| 10:    | CD-I; |
| 20:    | CD-ROM/XA |

For giving the disc type code to the multi-session disc, the CD-R drive 3 causes a common disc type code specifying the disc format of the multi-session disc to be recorded by the CPU block 30 in PSEC at POINT=A0 of the TOC area of each lead-in area LIA of each of the sessions other than the first session SS1, that is the sessions SS2 and SS3.

In the present embodiment, in order to give the session format in the multi-session disc, PMIN at POINT=A0 of the TOC area gives the value of the leading track number of the program area of the session, while PSEC gives the session formats [00], [10] and [20] as defined below:

| PSEC = | Session type = |
|--------|----------------|
| 00:    | CD audio session or CD-ROM mode 1 session; |
| 10:    | CD-I session; |
| 20:    | CD-ROM/XA session. |

The CD-R drive 3 causes the CPU block 30 to record [00] as PSEC at POINT A0 in the TOC area of the lead-in area LIA of the first session SS1, in which [00] specifies that the first session SS1 is an audio session having the program area PRA made up only of audio tracks.

Figure 4:
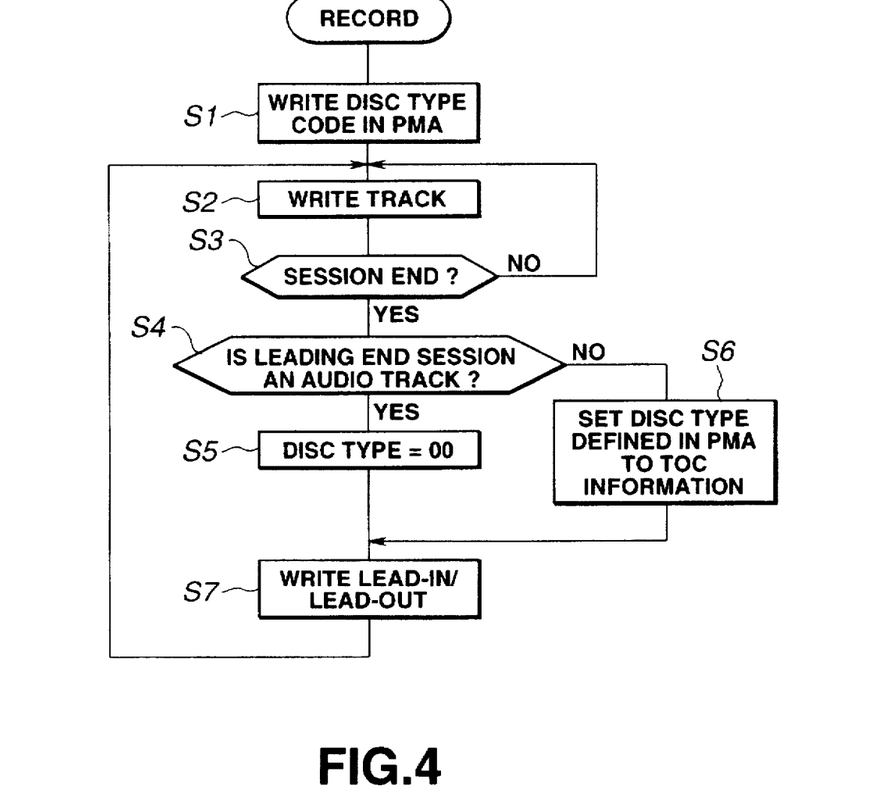
FIG. 4 is a flow chart showing the control operation by a CPU block during writing the CD-R drive in the optical disc recording/reproducing system.

In the above-described CD-R drive 3, the CPU block 30 is responsive to the write command from the host computer 1 to effect the control operation shown by the flow chart of FIG. 4 when recording data on the CD-R disc 10. If a CD-R disc 10, the disc type of which is not defined, is loaded, the disc type code specifying the disc type, that is the disc type code [00] specifying the CD-DA and CD-ROM, disc type code [10] specifying the CD-I or the disc type code [20] specifying the CD-ROM/XA is written at step S1 in the program memory area PMA of the CD-R disc 10 in order to denote the disc type of the CD-R disc 10. For example, if the disc type code [20] is written in the program memory area PMA, the CD-R disc 10 is denoted as a CD-ROM/XA type disc.

At step S2, the track is written in the program area PRA of the CD-R disc 10. The details of this operation will be explained further herein in regards to FIG. 7. It is then judged at step S3 whether or not the session has come to an end. If the result of the decision at step S3 is NO, that is, if the session has not come to a close, the CPU block 30 reverts to step S2 for reiterating track writing. If the result of decision at step S3 is YES, that is, if the session has come to a close, the CPU block 30 advances to step S4.

At step S4, it is judged whether or not the leading track of the session is an audio track. If the result of decision at step S4 is YES, that is, if the leading track of the session is an audio track, the CPU block 30 transfers to step S5 in order to give the disc type code |00| specifying the audio session as the TOC information for the session. The CPU block 30 then transfers to step S7 for writing the lead-in area LIA and the lead-out area LOA. The CPU block 30 then reverts to step S2 for recording the new session. On the other hand, if the result of decision at step S4 is NO, that is if the leading track of the session is not an audio track, the CPU block 30 transfers to step S6 in order to give the disc type code defined in the program memory area PMA, such as |20|, as the TOC information for the session. The CPU block 30 then transfers to step S7 for writing in the lead-in area LIA and in the lead-out area LOA. The CPU block 30 then reverts to step S2 for recording the new session.

Figure 7:
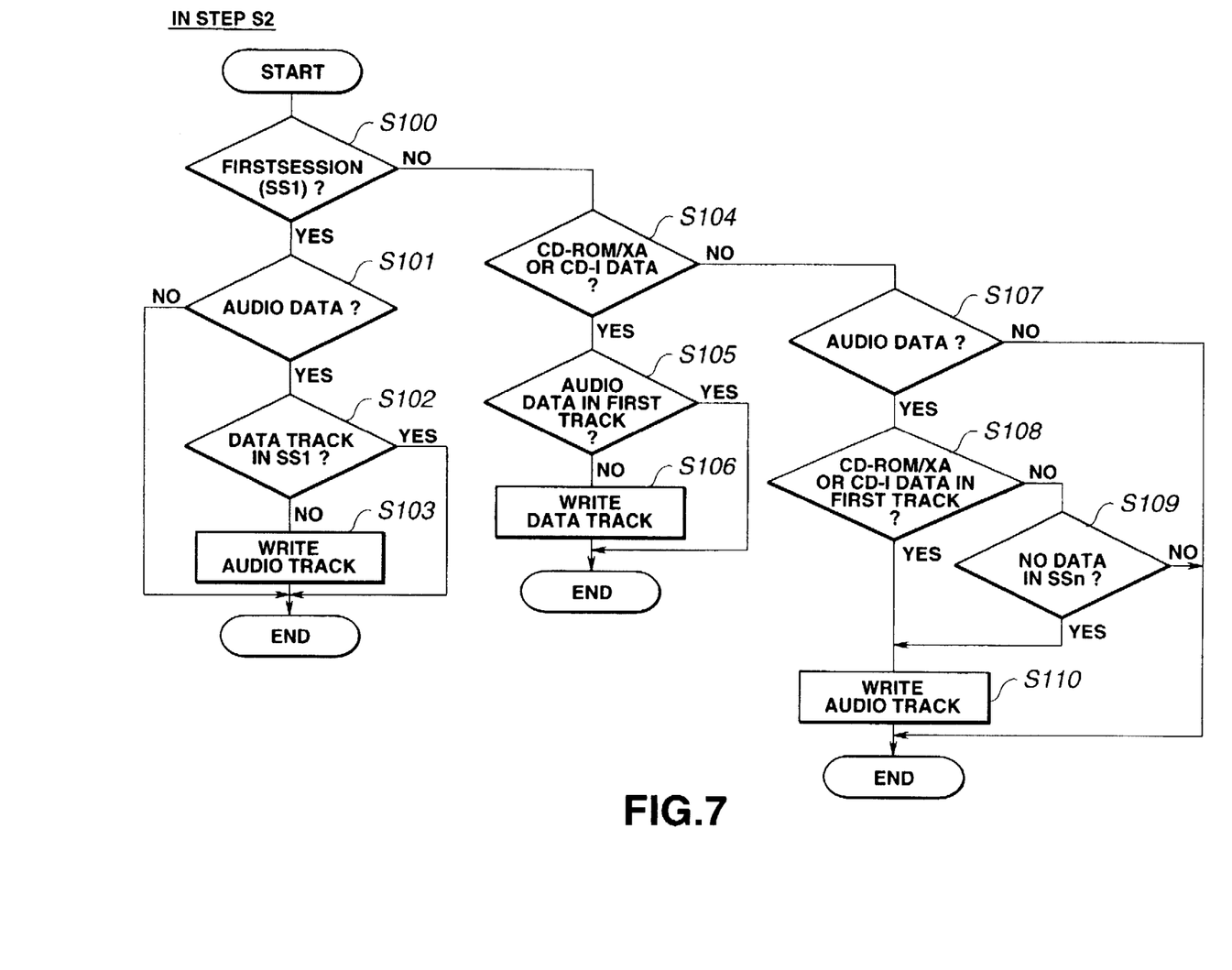
FIG. 7 is a flow chart showing the sequence followed in the writing of audio tracks and data tracks.

Referring now more particularly to FIG. 7, the details of step S2 of FIG. 4 will now be explained. At a first step S100, the CPU block 30 determines if this is the first session (SS1). If the determination is YES, the CPU block 30 proceeds to step S11 where the CPU block 30 determines if audio data is being recorded. If the answer is negative, the operation is ended. If, at step S101, the CPU block 30 determines that the data to be written is audio data, the CPU block 30 proceeds to step S102 and determines if there is a data (i.e. a CD-ROM/XA or CD-I data) track already recorded in the first session (SS1). If so, the operation is ended. If not, the CPU block 30 proceeds to step S103 to write the data in an audio track and end the operation. The completion of these steps S100–S103 ensures that only audio data is written in the first session, i.e., SS1=an audio session. The first session is thus designated as the "specified" or "particular" session.

If at step S100 the CPU block 30 determines that the session is subsequent to the first session (SSn, where n≠1), the CPU block 30 determines next, at step S104, if the data is of the CD-ROM/XA type or the CD-I type. If so, the CPU block 30 proceeds to step S105 where the CPU block 30 determines if there is audio data in the first track of the session. If so, the operation is ended. If not, the CPU block 30 proceeds to step S106 where a CD-ROM/XA or CD-I data track is written and the operation is ended. The completion of steps S100, S104–S106 ensures that for any session other than the first session, CD-ROM/XA or CD-I data will not be written in the session if there is audio data in the first track.

At step S104, if the CPU block 30 determines that the data to be recorded is not of the CD-ROM/XA type or the CD-I type, the CPU block 30 next determines at step S107 if the data is audio data. If not, the operation is ended. If so, the CPU block 30 determines at step S108 if the first track of the session is the CD-ROM/XA type data or the CD-I type data. If not, the CPU block 30 determines at step S109 if there is no data recorded in the session. If the answer is negative, i.e., there is data recorded in the session, the operation is ended. If not, the CPU block 30 proceeds to step S110. Conversely, if the determination at step S108 is affirmative, the CPU block 30 also proceeds to step S110. At step S110 the CPU block 30 writes the audio data to an audio track. The completion of steps S107–S110 ensures that for a session, other than the first session either only an audio track is written or that a data track is written as the first track of the session and any audio tracks are written subsequent to the data tracks in the session, i.e., SSn=a data session or an audio session, or both, where n≠1. Altogether, steps S100, S104 to S110 ensure that for any given session subsequent to the first session, only data tracks are written in the session, only audio tracks are written in the session, or if both audio tracks and data tracks are written in the session, the data tracks are written ahead of the audio tracks.

In sum, in recording data, the CPU block 30 sets the first session SS1 among the plural sessions as a particular session, and causes only audio data to be recorded in the first session SS1, while causing audio data and computer data to be recorded in subsequent sessions so that audio data will be recorded subsequent to the data track in the sessions comprised of other audio and data tracks.

Thus, it is possible with the present CD-R drive to produce a multi-session CD having a disc type code area in which, responsive to write commands from the host computer 1, audio data and/or computer data are recorded on the track basis in plural sessions on the CD-R disc 10 and the disc type code is also recorded in which a common disc type code is recorded in sessions other than a particular session among the plural sessions, which multi-session CD also has a disc type code area having recorded therein a disc type code specifying that the particular session is made up only of audio tracks, in which the particular session is an audio session composed only of audio tracks. With the multi-session CD thus prepared, it is possible to hold audio data and/or computer data in sessions other than the particular session among plural sessions constituted by one or more tracks comprised of audio tracks and/or data tracks, to hold the common disc type code in the disc type code area of the sessions other than the particular session, hold only audio data in the particular session, and to hold the disc type code specifying that the particular session is made up only of audio tracks in the disc type code area of the particular session.

That is, the CPU block 30 in the CD-R drive 3 functions as recording control means for recording only audio data in the particular session which is set as an audio session constituted only by audio tracks and for recording audio data or computer data in other sessions, while also functioning as disc type code recording control means for recording a common disc type code in the disc type code area of sessions other than the particular session and for recording the disc type code specifying that the particular session is only for audio tracks in the disc type code area of the particular session.

Also, with the present CD-R drive, the CPU block 30 sets the first session SS1 among the plural sessions as the particular session and records only audio data in the first session SS1 responsive to write commands from the host computer 1 to render it possible to fabricate the multi-session CD having audio sessions capable of reliably reproducing audio data with the old- generation CD player. In addition, with the present CD-R drive 3, the CPU block 30 causes the audio data and computer data to be recorded to form an audio track subsequent to all data tracks in a session made up of the audio tracks and the data tracks, so that a multi-session CD may be fabricated in which the audio tracks are provided subsequent to the data tracks in a session. With the multi-session CD, thus prepared, since the audio track is provided subsequent to the data track in the session made up of the audio track and the data track, it may be judged whether or not the session is an audio session depending on whether or not the leading track in the session is an audio track or a data track.

Figure 5:
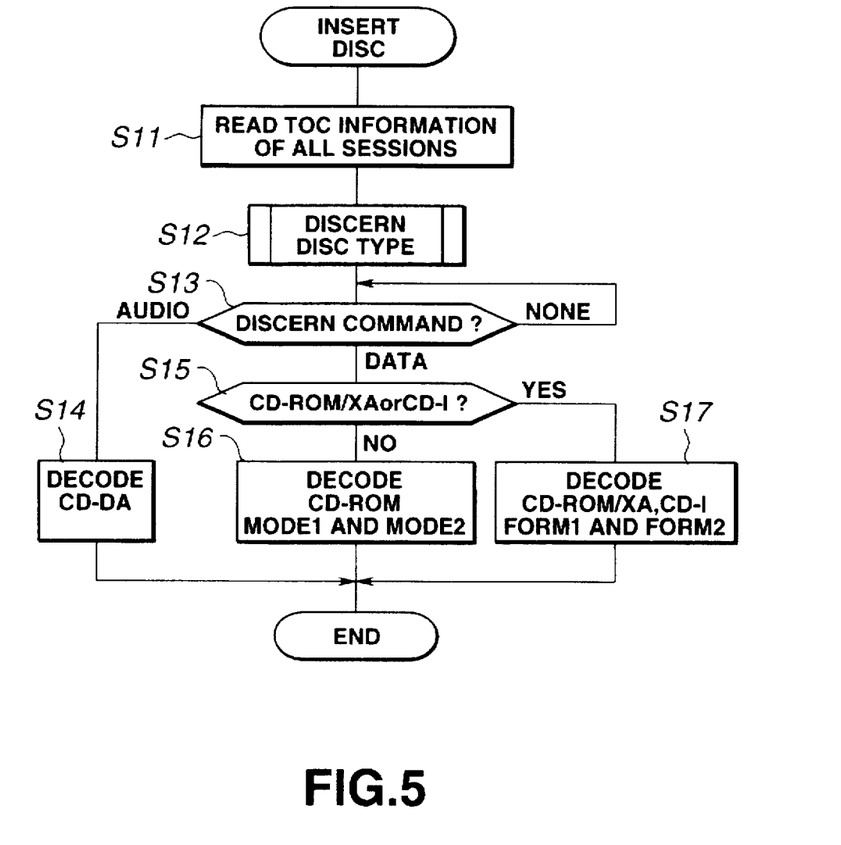
FIG. 5 is a flow chart showing the control operation by the CPU block during readout of the CD-drive.

During reproduction of recorded information by the present CD-R drive 3, when reading out data from the CD-R disc 10 responsive to the readout command from the host computer 1, the CPU block 30 performs the control in accordance with the flow chart shown in FIG. 5. When the CD-R disc 10 is loaded, the TOC information of all sessions is read out at step S11. The disc type is discerned at step S12 before the CPU block 30 transfers to step S13. At step S13, the command supplied from the host computer 1 is discerned. If the command is an audio data readout command, the CPU block 30 transfers to step S14. If the command is a computer data readout command, the CPU block 30 transfers to step S15. If no command is supplied, the command judgment is carried out repeatedly to await the supply of the next command.

At the step S14, the encoder/decoder circuit 33 is controlled for reproducing the CD-DA and the operation is thereafter ended. Alternatively, at the step S15, it is judged, based upon the disc type code recorded in the disc-type code area of the sessions having computer data tracks therein, whether or not the reproduced data format is the CD-I type or the CD-ROM/XA type.

If the result of judgment at step S15 is NO, that is, if the reproduced data format is not the CD-I type nor the CD-ROM/XA type, the CPU block 30 transfers to step S16 in order to control the encoder/decoder circuit 33 and in order to effect decoding in the so-called CD-ROM mode 1 and the CD-ROM mode 2 for reproduction. The mode 1 and mode 2 refer to recognized CD-ROM format standards.

If the result of decision at step S15 is YES, that is, if the reproduced data format is CD-I or CD-ROM/XA, the CPU block 30 transfers to step S17 in order to control the encoder/decoder circuit 33 and in order to effect decoding in the CD-I or CD-ROM/XA form 1 or form 2 for reproduction. The form 1 and form 2 refer to recognized CD-ROM format standards.

Thus, it is possible with the present CD-R drive 3 to discriminate the common disc type code recorded in the disc type code area of the sessions other than the particular session made up only of audio tracks by the CPU block 30 and to switch the coding responsive to the disc type code for reliable reproduction. That is, the CPU block 30 in the CD-R drive 3 functions as disc type code discriminating means for discriminating the common disc type code recorded in the disc type code area of sessions other than the particular session, while also functioning as control means for switching the decoding by the encoder/decoder circuit 33 responsive to the disc type code discriminated by the disc type code discriminating means.

Figure 6:
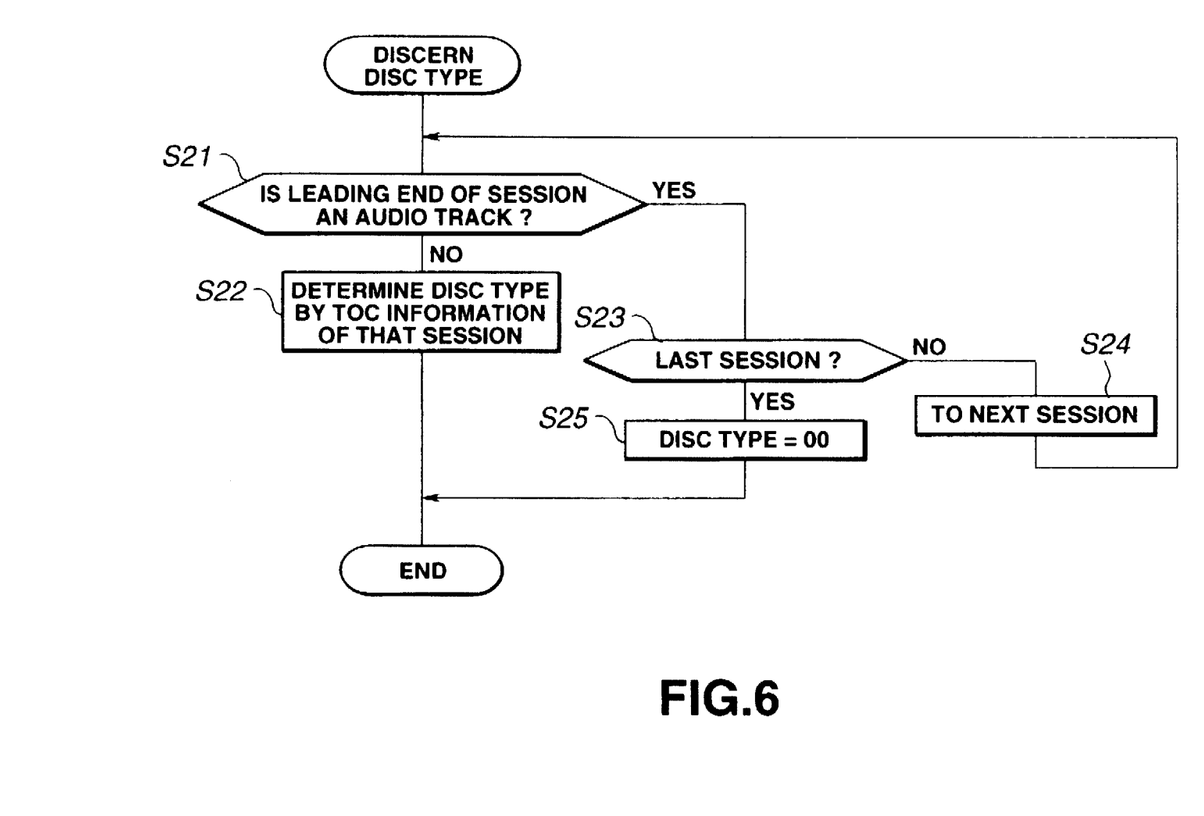
FIG. 6 is a flow chart showing the sequence of the disc discrimination by the CPU block of the CD-R drive.

The CPU block 30 effects disc type discrimination at step S12 in accordance with the procedure shown in a flow chart of FIG. 6. That is, in discriminating the disc type, it is judged whether or not the leading track of the session, i.e., the first track, is an audio track. If the result of decision at step S21 is NO, that is if the leading track of the session is not an audio track, the CPU block 30 transfers to step S22. If the result of the decision at step S21 is YES, that is if the leading track of the session is an audio track, the CPU block 30 transfers to step S23.

At step S22, the CPU block 30 decides the disc type depending upon the disc type code afforded as the TOC information of the session, and terminates the disc type discrimination. Alternatively, at step S23, the CPU block 30 judges whether or not the session is the last session. If the result of decision at step S23 is NO, that is, if the session is not the last session, the CPU block 30 advances to the next session at step S24 and reverts to step S21 in order to decide whether or not the leading track of the next session is the audio track. If the result of decision at step S23 is YES, that is, if the session is the last session, the CPU block 30 transfers to step 25 where the disc type is determined to be [00] to terminate the disc type discriminating operation.

That is, the CPU block 30 in the CD-R drive 3 functions as disc type discriminating means for detecting the session whose leading track is a data track, based upon the playback data from the CD-R disc 10, and discriminates the disc type code recorded in the disc type code area of the session as a common disc type code. Thus, it is possible with the present CD-R drive 3 to promptly discriminate by the CPU block 30 the common disc type code recorded in the disc type code area of the sessions other than the particular session among the plural sessions which is comprised only of the audio tracks and to switch the coding operation depending upon the disc type code by way of effecting reproduction.

It is possible with the disc-shaped recording medium of the present invention to hold audio data and/or computer data in sessions other than the particular session, comprised of one or more audio tracks and/or data tracks, to hold the common disc type code in the disc type code area of each of the sessions other than the particular session, to hold only audio data in the particular session and to hold in the disc type code area of the particular session the disc type code specifying that the particular session is comprised only of the audio tracks. By setting the first session among the plural sessions as the particular session, the disc-shaped recording medium of the present invention becomes a multi-session disc-shaped recording medium having an audio session positively audio-reproducible with the old-generation CD player.

With the disc-shaped recording medium according to the present invention, since an audio track is always provided subsequent to a data track in the sessions comprised of both of the audio tracks and the data tracks, it may be judged whether the session is an audio session depending upon whether or not the leading track of the session is a data track.

With the recording apparatus of the present invention, a particular session is used as an audio session comprised only of audio tracks and audio data and/or computer data are recorded in the remaining sessions, under control by recording control means. Further, a common disc type code is recorded in the disc type code areas of the sessions other than the particular session, among the plural sessions, while a disc type code specifying that the session is comprised only of audio tracks is recorded in the disc type code area of the particular session, under control by the disc type code recording control means. Thus, it becomes possible to produce a disc-shaped recording medium having plural sessions each being made up of one or more tracks, that is, audio tracks having audio data recorded thereon and/or data tracks having computer data recorded thereon, including a disc type code area in which a common disc type code is recorded in other than a particular session among the plural sessions, in which the particular session is an audio session comprised only of audio tracks and having recorded therein a disc type code specifying that the particular session is comprised only of audio tracks.

With the recording apparatus of the present invention, the disc type code recording control means causes the disc type code to be recorded in a disc type code area of the lead-in area of a disc-shaped recording medium having respective sessions each comprised of a lead-in area specifying the beginning of the session, a program area comprised of audio tracks and/or data tracks and a lead-out area specifying the end of the session. Thus, it becomes possible to produce a disc- shaped recording medium whose particular session is an audio session comprised only of audio tracks and has recorded therein a disc type code specifying that the session is comprised only of audio tracks, and whose plural sessions are each comprised of a lead-in area specifying the beginning of the session, a program area comprised of audio tracks and/or data tracks and a lead-out area specifying the end of the session, with the lead-in area having a disc type code area having the disc type code recorded therein.

With the recording apparatus of the present invention, the first session among plural sessions is the particular session, and only audio data is recorded in the first session under control by the recording control means. Thus, it becomes possible to produce a disc-shaped recording medium whose particular session is an audio session comprised only of audio tracks and has recorded therein a disc type code specifying that the session is comprised only of audio tracks, and whose first session among the plural sessions is the particular session.

With the recording apparatus of the present invention, the recording control means effects audio data and computer data recording control so that the audio track is provided subsequent to the data track in the session comprised of the audio track and the data track. Thus, it becomes possible to produce a disc- shaped recording medium whose particular session is an audio session comprised only of audio tracks and has recorded therein a disc type code specifying that the session is comprised only of audio tracks, and whose first session among the plural sessions is the particular session, in which the audio track is provided subsequent to the data track in a session comprised of the audio track and the data track.

With the reproducing apparatus for a disc-shaped recording medium, since the common disc type code recorded in the disc type code area of the sessions other than the particular session comprised only of audio tracks is discriminated by disc type code discriminating means, decoding by decoding means is switched by control means depending upon the disc type code and playback data from the disc-shaped recording medium is decoded responsive to the disc type code, it becomes possible to reliably reproduce a disc-shaped recording medium having plural sessions comprised of one or more tracks having an audio track having audio data recorded thereon and a data track having computer data recorded thereon, in which each of the sessions other than the particular session has a disc type code area having a common disc type code recorded therein, the particular session is an audio session made up only of audio tracks, and in which the particular session has a disc type code area having recorded therein a disc type code area specifying that the particular session is made up only of audio tracks.

With the reproducing apparatus for a disc reproducing apparatus for a disc-shaped recording medium according to the present invention, the disc type code discriminating means detects the session whose leading track is a data track based upon playback data from the disc-shaped recording medium, and discriminates the disc type code recorded in the disc type code of the session as being a common disc type code, it becomes possible to promptly discriminate the disc type of the disc- shaped recording medium in which the particular session is an audio session comprised only of the audio tracks, in which the particular session has the disc type code area indicating that the session is comprised only of audio tracks, and in which an audio track is provided subsequent to the data track in the session comprised of the audio track and the data track.

Thus, the present invention provides a multi-session disc - shaped recording medium capable of reliably reproducing audio data with an old-generation CD player, a recording apparatus and a reproducing apparatus for the recording medium.

Although the present invention has been shown and described with respect to preferred embodiments, various changes and modifications which are obvious to a person skilled in the art to which the invention pertains are deemed to lie within the spirit and scope of the invention as claimed.

What is claimed is:

1. A disc-shaped recording medium having plural sessions each comprised of one or more tracks, wherein the tracks include one or more audio tracks containing audio data recorded thereon and one or more data tracks containing computer data which is formed based upon the audio data format recorded thereon, each session having a disc type code area in which one of a common disc type code and a particular disc type code is recorded, the particular disc type code being recorded in the disc type code area located in an audio session comprised only of one or more audio tracks.

2. The disc-shaped recording medium as claimed in claim 1, wherein the plural sessions are each comprised of a lead-in area specifying the beginning of the session and having the disc type code area, a program area having the one or more audio tracks and the one or more data tracks, and a lead-out area specifying the end of the session.

3. The disc-shaped recording medium as claimed in claim 1, in which, in a session comprised of both the audio tracks and the data tracks, the audio track is provided subsequent to all of the data tracks.

4. The disc-shaped recording medium of claim 1, wherein the audio session corresponds to the first session among the plural sessions.

5. The disc-shaped recording medium of claim 4, wherein the first session corresponds to the innermost session radially in relation to the disc-shaped recording medium.

6. Apparatus for recording audio data or computer data on a disc-shaped recording medium having plural sessions each comprised of a disc type code area and one or more tracks, the tracks including at least one audio track containing audio data recorded thereon and one or more data tracks containing computer data which is formed based upon the audio data format recorded thereon, and wherein a particular session is an audio session having only one or more audio tracks, the apparatus comprising:

recording means for recording audio data or computer data in each session on the disc-shaped recording medium;

data recording control means for controlling the recording means so that only audio data is recorded in the particular session and for causing computer data to be recorded in at least one of the other sessions; and disc type code recording control means for causing a particular disc type code indicating that the session is comprised only of the audio tracks to be recorded in the disc type code area in the particular session.

7. The apparatus of claim 6, wherein the disc type code recording means controls the recording means to record a common disc type code in a disc type code area of each of the sessions other than the particular session to thereby indicate that each of such other sessions contains a data track.

8. The apparatus as claimed in claim 6, wherein the plural sessions are each comprised of a lead-in area specifying the beginning of a session and having the disc type code area, a program area comprised of the one or more audio tracks or the one or more data tracks, and a lead-out area specifying the end of the session.

9. The apparatus as claimed in claim 6, wherein the recording control means defines the first session of the plural sessions as the particular session and only audio data is recorded in the first session.

10. The apparatus as claimed in claim 6, in which the recording control means causes the audio data and the computer data to be recorded in one or more sessions each comprised of one or more audio tracks and one or more data tracks, with the one or more audio tracks being recorded subsequent to the one or more data tracks in each session.

11. The apparatus as claimed in claim 6, wherein the disc-shaped recording medium further includes a program memory area for recording therein information, including disc type codes, relative to the data tracks and the audio tracks of all sessions and wherein the apparatus further comprises memory means for storing the information recorded in the program memory area.

12. The apparatus as claimed in claim 11, wherein the code recording control means detects if a leading track of a session is not an audio track and, if so, supplies to the recording means from the memory means the disc type code recorded in the program memory area so that the common disc type code is recorded in the disc type code area of the session by the recording means.

13. An apparatus for reproducing audio data or computer data from a disc-shaped recording medium having plural sessions each comprised of one or more tracks, the tracks including one or more audio tracks having audio data recorded thereon and one or more data tracks having computer data recorded thereon which is formed based upon the audio data format, the apparatus comprising:

reproducing means for reproducing signals corresponding to the audio data or the computer data from the disc-shaped recording medium;

decoding means for decoding the reproduced signals into the audio data or the computer data;

discriminating means for discriminating between an audio session in which only audio tracks are recorded and a data session in which at least one or more data tracks are recorded by means of a disc type code recorded in a disc type code area located in each of the sessions, the disc type code indicating whether the session includes only one or more audio tracks or at least one data track; and control means for switching the decoding operation by the decoding means responsive to the disc type code discriminated by the discriminating means so that the audio data and the computer data are appropriately decoded by the decoding means.

14. The apparatus as claimed in claim 13, wherein the audio session corresponds to a first session among the plural sessions and wherein the discriminating means identifies the first session as the audio session in response to the disc type code recorded in the disc type code area of the first session.

15. The apparatus as claimed in claim 13, wherein the plural sessions are each comprised of a lead-in area specifying the beginning of the session and having the disc type code area, a program area having the one or more audio tracks or the one or more data tracks, and a lead-out area specifying the end of the session.

16. The apparatus as claimed in claim 13, in which, in a session comprised of both the audio tracks and the data tracks, the audio track is provided subsequent to all of the data tracks.

17. The apparatus as claimed in claim 16, wherein the disc type code area is located at a leading end of a data track in each data session.

18. Apparatus for recording audio data or computer data on a disc-shaped recording medium having plural sessions, comprising:

recording means for recording an audio data or a computer data in each session on a disc-shaped recording medium having plural sessions, each session comprising a disc type code area and one or more tracks, the tracks including at least one audio track containing said audio data recorded thereon and one or more data tracks containing said computer data formed based upon the audio data format recorded thereon;

data recording control means for controlling the recording means so that only audio data is recorded in a particular session and for causing said computer data to be recorded in at least one of the other sessions where said particular session includes an audio session having only one or more audio tracks; and disc type code recording control means for causing a particular disc type code indicating that the session is comprised only of the audio tracks to be recorded in the disc type code area in the particular session.

19. The apparatus of claim 18, wherein the disc type code recording means controls the recording means to record a common disc type code in a disc type code area of each of the sessions other than the particular session to thereby indicate that each of such other sessions contains a data track.

20. The apparatus as claimed in claim 18, wherein the plural sessions are each comprised of a lead-in area specifying the beginning of a session and having the disc type code area, a program area comprised of the one or more audio tracks or the one or more data tracks, and a lead-out area specifying the end of the session.

21. The apparatus as claimed in claim 18, wherein the recording control means defines the first session of the plural sessions as the particular session and only audio data is recorded in the first session.

22. The apparatus as claimed in claim 18, in which the recording control means causes the audio data and the computer data to be recorded in one or more sessions each comprised of one or more audio tracks and one or more data tracks, with the one or more audio tracks being recorded subsequent to the one or more data tracks in each session.

23. The apparatus as claimed in claim 18, wherein the disc-shaped recording medium further includes a program memory area for recording therein information, including disc type codes, relative to the data tracks and the audio tracks of all sessions and wherein the apparatus further comprises memory means for storing the information recorded in the program memory area.

24. The apparatus as claimed in claim 23, wherein the code recording control means detects if a leading track of a session is not an audio track and, if so, supplies to the recording means from the memory means the disc type code recorded in the program memory area so that the common disc type code is recorded in the disc type code area of the session by the recording means.

25. An apparatus for reproducing audio data or computer data from a disc-shaped recording medium having plural sessions, comprising:

reproducing means for reproducing signals corresponding to an audio data or a computer data from a disc-shaped recording medium having plural sessions, each session including one or more tracks, the tracks including one or more audio tracks having the audio data recorded thereon and one or more data tracks having the computer data recorded thereon formed based upon the audio data format;

decoding means for decoding the reproduced signals into the audio data or the computer data;

discriminating means for discriminating between an audio session in which only audio tracks are recorded and a data session in which at least one or more data tracks are recorded, by means of a disc type code recorded in a disc type code area located in each of the sessions, the disc type code indicating whether the session includes only one or more audio tracks or at least one data track; and control means for switching the decoding operation by the decoding means responsive to the disc type code discriminated by the discriminating means so that the audio data and the computer data are appropriately decoded by the decoding means.

26. The apparatus as claimed in claim 25, wherein the audio session corresponds to a first session among the plural sessions and wherein the discriminating means identifies the first session as the audio session in response to the disc type code recorded in the disc type code area of the first session.

27. The apparatus as claimed in claim 25, wherein the plural sessions are each comprised of a lead-in area specifying the beginning of the session and having the disc type code area, a program area having the one or more audio tracks or the one or more data tracks, and a lead-out area specifying the end of the session.

28. The apparatus as claimed in claim 25, in which, in a session comprised of both the audio tracks and the data tracks, the audio track is provided subsequent to all of the data tracks.

29. The apparatus as claimed in claim 28, wherein the disc type code area is located at a leading end of a data track in each data session.

* * * * *